Dec. 5, 1939.  F. A. DE NOL  2,182,490

NEGATIVE CARBON CLAMP OR HOLDER FOR HIGH INTENSITY MOTION PICTURE MACHINE

Filed Aug. 12, 1939

INVENTOR.
Frank A. De Nol
BY Lawler & Lawler
ATTORNEYS.

Patented Dec. 5, 1939

2,182,490

UNITED STATES PATENT OFFICE 2,182,490

NEGATIVE CARBON CLAMP OR HOLDER FOR HIGH INTENSITY MOTION PICTURE MACHINE

Frank A. De Nol, Cleveland, Ohio

Application August 12, 1939, Serial No. 289,890

4 Claims. (Cl. 176—119)

This invention relates to a carbon holder, and has for its objects to provide a negative carbon clamp or holder adapted for use in connection with a high intensity lamp motion picture machine, and being so constructed and arranged to firmly support the carbon, permit its removal, and assure an accurate replacement of a new carbon in longitudinal alignment in the clamp.

The object of this invention is to provide a simple construction having efficient means for quickly securing the carbon in place, and means for securing the clamp against movement after the clamp is set on the carbon, and will not loosen during use.

Other object and advantage reside in certain novel features of construction, arrangement and combination of parts, which will hereinafter be more fully described and pointed out in the appended claims.

Referring to the drawing.

Like reference characters are used to designate similar parts in the drawing and in the following description of the invention.

Figure 1:
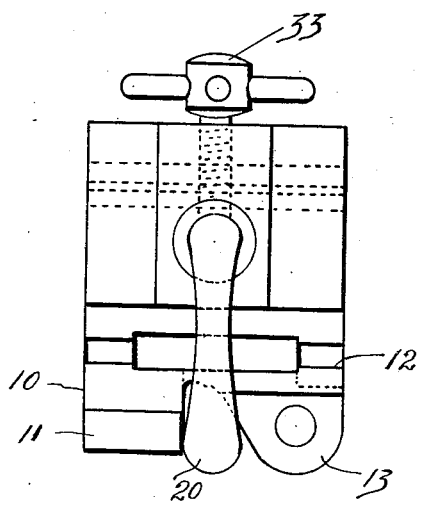
Figure 1 is a side elevation of the device embodying the invention.
Figure 2:
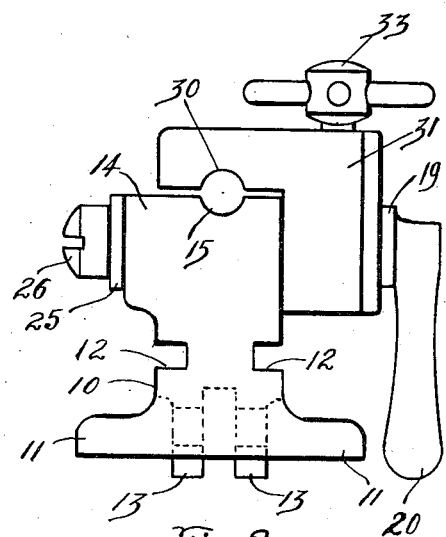
Figure 2 is an end view of the same.
Figure 3:
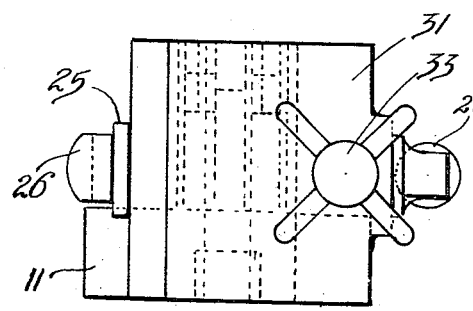
Figure 3 is a plan view of the same.
Figure 4:
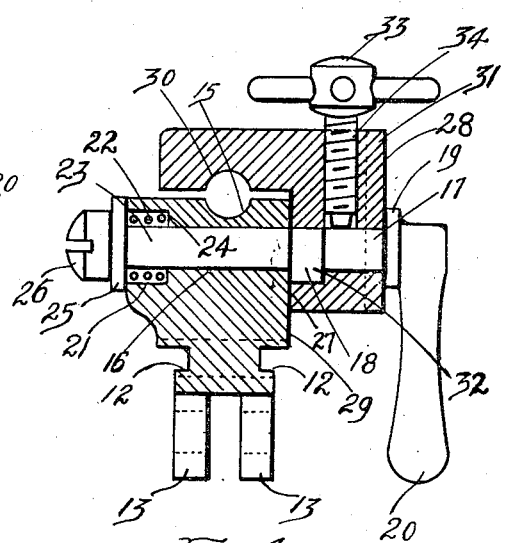
Figure 4 represents a vertical section of same.

Referring now to the drawing the numeral 10 may designate a suitable bracket or support having an integral base 11 extending laterally therefrom and by means of which the bracket may be mounted and secured in place on the motion picture machine lamp for use. The slots 12 and the lugs or ears 13 are provided to accommodate other vital working parts of the machine, that form no part of this invention other than in combination.

The head 14 of the bracket is provided with a longitudinal bearing 15. A through transverse bearing or bore 16 is provided in the head below the bearing for the reception of the shaft 17 on which the cam 18 is fixed or formed therewith. The shaft is provided with a fixed collar 19 and a handle 20 so that the shaft with its cam may be conveniently turned by the operator.

In the head there is provided a chamber 21 for the reception of a helical spring 22 surrounds the end 23 of the shaft 17 and is confined between the shoulder 24 and the washer 25, held in place by the screw 26 in the end of the shaft screw-threaded to receive the same. The spiral spring yielding holds the face 27 of the L bar 28 in frictional engagement with the face 29 of the bracket. The compression of the helical spring, bearing at its inner end upon the shoulder 24, and at its outer end on the inner surface of the washer 25, the L bar is spring-urged into frictional contact by the fixed collar on the shaft, which acts against the resistance of the compression spring.

The jaw or L bar 28 may be of right-angled bar construction and forms the upper clamp portion of the device, and is provided with a longitudinal bearing 30 in alignment with the bearing in the bracket. In the leg 31 of the L bar there is provided a bearing 32 which cooperates with the cam 18 which is eccentrically journaled therein, and by movement of which, movement is imparted to the L bar to release, clamp and lock the carbon in the device.

A locking screw 33 which is externally screw-threaded engaged in the internally screw-threaded bore 34 and is adapted to immovably secure the shaft against turning when tightened thereagainst, thereby insuring the locking position of the cam and hence the clamp that clamps the negative carbon in the device.

I am aware that this invention may be embodied in other specific forms without departing from the spirit or essential attributes thereof; and I therefore desire the present embodiment to be considered in all respects as illustrative and not restrictive, reference being had to the appended claims rather than to the foregoing description to indicate the scope of the invention.

I claim:

1. In a negative carbon clamp for high intensity motion picture machine the combination of a bracket having a carbon bearing therein, a movable clamp member having a carbon bearing in alignment with the bearing in the bracket, a shaft, a cam fast thereon cooperating with the movable clamp member imparting different degrees of movement to said member, and means in the clamp engaging the shaft to prevent rotation thereof when screwed thereagainst.

2. In a negative carbon clamp for high intensity motion picture machine, the combination of a bracket having a longitudinal bearing, and having therebelow a through shaft bearing, an L-bar having a longitudinal bearing in alignment with the bracket, a shaft having a cam thereon, the shaft journaled in the shaft bearing and adapted to impart movement to the L-bar to release a carbon mounted in the device when turned in one direction, and to clamp the carbon when turned in another direction.

3. In a clamp for a negative carbon high intensity motion picture machine, the combination of a right angled clamping member movable in response to the turning movement of a shaft having a cam thereon and which may be rotated in either direction through 360° and means in the clamp to position and maintain the clamp in readiness previous to clamping operation.

4. In a negative carbon clamp for high intensity motion picture machine the combination of a bracket having a carbon bearing therein, a movable L-shaped clamp member having a carbon bearing in alignment with the bearing in the bracket, a shaft, a cam fast on the shaft cooperating with the movable clamp member imparting movement thereto on rotation of the shaft, means to immobilize said shaft and hence the cam, and means to resiliently urge the clamp laterally into frictional contact with an oppositely disposed face of the bracket.

FRANK A. DE NOL.